United States Patent
Stiesdal

(10) Patent No.: US 8,610,321 B2
(45) Date of Patent: Dec. 17, 2013

(54) GENERATOR, WIND TURBINE, METHOD OF ASSEMBLING A GENERATOR AND USE OF A GENERATOR IN A WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 273 days.

(21) Appl. No.: 13/165,966

(22) Filed: Jun. 22, 2011

(65) Prior Publication Data

US 2011/0316287 A1    Dec. 29, 2011

(30) Foreign Application Priority Data

Jun. 29, 2010 (EP) .................................... 10167615

(51) Int. Cl.
*H02K 11/00* (2006.01)
*H02K 11/04* (2006.01)

(52) U.S. Cl.
USPC .............. 310/68 D; 290/55; 290/44; 290/43; 290/54

(58) Field of Classification Search
USPC .......................... 290/43, 44, 54, 55; 310/68 D
IPC .............................................. H02K 11/00,11/04
See application file for complete search history.

(56) References Cited

U.S. PATENT DOCUMENTS

| | | | | |
|---|---|---|---|---|
| 4,103,193 A | * | 7/1978 | Ito | 310/68 D |
| 5,083,039 A | | 1/1992 | Richardson et al. | |
| 2002/0014773 A1 | * | 2/2002 | Stricker | 290/44 |
| 2006/0103137 A1 | * | 5/2006 | Wobben | 290/44 |
| 2007/0024060 A1 | | 2/2007 | Bacon | |
| 2009/0212568 A1 | * | 8/2009 | Maibach et al. | 290/44 |
| 2009/0243294 A1 | * | 10/2009 | Shiota et al. | 290/43 |
| 2010/0133816 A1 | | 6/2010 | Abolhassani et al. | |

FOREIGN PATENT DOCUMENTS

| | | |
|---|---|---|
| CN | 200996357 Y | 12/2007 |
| EP | 0030357 A2 | 6/1981 |
| EP | 1416604 A2 | 5/2004 |
| EP | 1659674 A1 | 5/2006 |
| EP | 2071709 A1 | 6/2009 |
| WO | WO 0195463 A1 | 12/2001 |
| WO | WO 04001949 A1 | 12/2003 |
| WO | WO2008006614 A1 | 1/2008 |

OTHER PUBLICATIONS

Communication from A J Park, Intellectual Property Office, New Zealand, Jul. 28, 2011, pp. 1-2.

* cited by examiner

*Primary Examiner* — Terrance Kenerly

(57) ABSTRACT

A generator is provided comprising a rotor with a number of magnetic rotor pole shoes, a stator with a number of stator coils wound on the stator, and a generator-utility grid interface comprising a plurality of diode rectifiers, each diode rectifier is connected to a stator coil and the number of stator coils is greater than the number of rotor pole shoes, or the number M of rotor pole shoes is greater than, but not an integer multiple of, the number of stator coils. A wind turbine utilizing the generator of the present invention and a method of assembling such a generator are provided.

12 Claims, 5 Drawing Sheets

GENERATOR, WIND TURBINE, METHOD OF ASSEMBLING A GENERATOR AND USE OF A GENERATOR IN A WIND TURBINE

CROSS REFERENCE TO RELATED APPLICATIONS

This application claims priority of European Patent Office application No. 10167615.3 EP filed Jun. 29, 2010, which is incorporated by reference herein in its entirety.

FIELD OF INVENTION

The present invention describes an electrical generator, in particular a generator of a wind turbine, and a wind turbine comprising such a generator. The invention further describes a method of assembling such a generator.

BACKGROUND OF INVENTION

Wind turbines provide a primary source of energy that can be converted into electricity and supplied to utility power grids, to which the generator is electrically connected. Conversion of wind energy to electrical energy is accomplished in a wind turbine by driving an electrical generator, commonly an AC induction motor. If the electrical power generated by a wind turbine is to be supplied to a utility power grid, then it is required to have a constant frequency that is synchronized to the utility line frequency, for example 50 Hz or 60 Hz. This can be accomplished by driving the generator at a constant rotational speed, which, unless a variable speed transmission is used, requires that the wind turbine rotates at a constant speed. Unfortunately, constant speed operation of a wind turbine limits its energy conversion efficiency due to variable wind conditions. Turbine rotor speed needs to be proportional to wind speed for optimal energy recovery.

Variable-speed wind turbines have been proposed as a way of increasing the energy conversion efficiencies of wind turbines. By varying the rotor speed according to varying wind conditions, improved energy recovery can be achieved over a range of wind speeds. Also importantly, the peak mechanical stresses caused by wind gusts can be reduced by allowing the wind turbine to speed up in response to wind gusts, thus limiting the torque reached on the generator of the wind turbine. The increased kinetic energy of the rotor caused by wind gusts serves as a short term energy storage medium to further improve energy conversion. Such operation, however, requires a responsive torque control system.

Although variable-speed wind turbines are advantageous from the perspective of increased energy conversion and reduced stresses, the electrical generation system is of necessity more complex than that of a constant-speed wind turbine. Since a generator is usually coupled to a variable-speed rotor through a fixed-ratio gear transmission, the electrical power produced by the generator will have a variable frequency. This requires a conversion from the variable frequency AC output by the generator to a constant frequency AC for supplying the utility power grid. The conversion can be accomplished either directly by a frequency converter or through an intermediate conversion to DC by a rectifier and reconversion to fixed-frequency AC by an inverter.

In a known realisation, the energy generated by the wind turbine generator is provided to a utility grid via a converter system that comprises at least an AC/DC converter, to a DC capacitor connected to a following grid-side DC/AC converter and ultimately to the utility grid, the signal so processed having suitable voltage and frequency levels. Such a solution, due to the fact that the energy generated from the wind turbine needs to pass through various expensive devices, makes the conversion of the generated wind energy unnecessarily expensive. Further, despite the various levels of signal processing, the generated signal, when ready to be fed into the utility grid, is not free of undesirable harmonic distortion components.

For example, U.S. Pat. No. 5,083,039 describes a power converter circuit comprising a number of active rectifiers and a number of active switching devices controlled by a control circuit. Due to the large number of components, the converter system is very expensive, and these costs have an impact on the cost of the energy fed into the utility grid. Further, the signal processed in this converter circuit may still not be free of undesirable harmonic distortion components.

SUMMARY OF INVENTION

It is an object of the present invention to provide a generator that has a simplified configuration, a reduced size, and is in particular suitable for a wind turbine, also a variable-speed wind turbine.

The object of the invention is achieved by a generator, by a wind turbine comprising the generator of the present invention, and by a method of assembling a generator according to the independent claims.

The proposed generator comprises a rotor with a number M of magnetic rotor pole shoes and a means for producing a magnetic field, e.g. one or more permanent magnets, and a stator with a number C of stator coils wound on the stator. Usually the stator coils are wound on a number of stator poles, or are mounted in slots in a stator body or segments of a stator body. According to the invention, the generator comprises a generator-utility grid interface comprising a plurality of diode rectifiers wherein each diode rectifier is connected to a stator coil. Thereby, a diode rectifier may be any rectifier built up by a number of simple diodes. In a first alternative of the invention, the number C of stator coils is chosen such it is greater than the number M of rotor pole shoes. In a second alternative of the invention, the number M of rotor pole shoes is greater than, but not an integer multiple of, the number C of stator coils.

By using the diode rectifier in synergetic combination with the numerical proportion of stator coils and rotor poles shoes according to the invention, it is ensured that the output voltages induced in different stator coils during rotation of the rotor are temporally shifted against each other. Therefore, by appropriate parallel connection of different stator coils via the diode rectifiers an essentially DC-voltage can be generated that is suitable for a DC link capacitor from which the power may be send to the grid via an inverter and/or other suitable components.

The favourable use of diode rectifiers allows the replacement of a generator-side converter commonly used in the art. Since said generator-side converter is, as described above, a device that introduces undesirable harmonics while transmitting the generated signal to a utility grid, its replacement by a diode rectifier leads to the elimination of any undesirable harmonics. Furthermore, since the diode rectifier is a particular simple device, and compact the generator of the present invention can be realized in a particularly cost-effective and simple manner.

The simpler configuration allows a straightforward manufacture of the generator. A method of assembling a generator according to the invention therefore comprises the following steps:

a) configuring a rotor with a number M of magnetic rotor pole shoes and means for producing a magnetic field;

b) configuring a stator with a number C of stator coils wound on the stator, whereby the number C of stator coils is greater than the number M of rotor pole shoes, or the number M of rotor pole shoes is greater than, but not an integer multiple of, the number C of stator coils;

c) assembling the stator with the rotor and with a generator-utility grid interface, whereby the generator-utility grid interface is equipped with a plurality of diode rectifiers, whereby each diode rectifier is connected to a stator coil.

As mentioned above the generator according to the invention is particularly suited for use in wind turbines, particularly variable-speed wind turbines.

Particularly advantageous embodiments and features of the invention are given by the dependent claims and the following description. Thereby, the method of assembling a generator may be further developed according to the dependent claims of the generator. Features of the dependent claims can be combined to arrive at further advantage embodiments.

A wind turbine generator is traditionally built so that its number of stator poles C and the number of rotor pole shoes M are equal, or such that C is an integer multiple of M, such as 2M, 3M etc. However, with such a physical construction of the generator cogging torque arises when all rotor pole shoes symmetrically pass stator poles at the same time during rotation, and the magnetic attraction is greatest at the moment when the rotor pole and the stator pole are radially aligned. This is a known undesirable effect that contributes to the output ripple, vibration and noise in the machine.

Therefore, in a preferred embodiment of the invention, the stator coils and the rotor pole shoes are arranged in an asymmetric distribution such that at least a fraction of the rotor pole shoes pass stator coils asynchronously during rotation. This requirement is, for example, automatically given in the above mentioned second alternative of the invention in which the number M of rotor pole shoes is larger than, but not an integer multiple of, the number C of stator coils. In the first alternative of the invention, in which the number C of stator coils is greater than the number M of rotor pole shoes, this may easily be realized—in a similar way as in the second alternative—by choosing the numerical relationship such that the number C of stator coils is not an integer multiple of the number M of rotor pole shoes.

Since, according to this embodiment of the invention, not all rotor pole shoes symmetrically pass stator poles at the same time during rotation, the magnetic attractions between rotor poles and stator poles are essentially "averaged out" during rotation of the rotor. Therefore, the undesired effect of cogging torque is minimized and vibration and noise in the machine are reduced.

Usual utility grids comprise multiple phases to which the energy produced by a generator of a wind turbine should be fed in. Therefore, in a preferred embodiment of the invention, the stator coils are assigned to different phases of a multi-phase utility grid, to which the generator may be electrically connected. In other words, the stator coils are connected via the generator-utility grid interface to the corresponding connectors of the utility grid so that, when the generator is linked to the utility grid, each stator coil is electrically connected to one of the phases of the utility grid. Preferably, the generator is a three-phase generator.

In a particularly simple, preferred embodiment, each stator coil is connected to its own dedicated diode rectifier.

However, in an alternative embodiment, a group of stator coils may share a common diode rectifier when these coils are assigned to a common phase, and, during rotation of the rotor, each coil of the group carries a synchronous identical voltage form over time. In this embodiment, any stator coils of a common phase which do not carry a synchronous identical voltage form over time should have a separate diode rectifier. This embodiment may be preferred if the stator comprises a high number of stator coils, so that the coils assigned to a specific phase of the utility grid may be grouped into a sufficient number of groups such that enough rectified pulses of the groups assigned to the same phase superpose to a essentially constant voltage for a revolution of the rotor.

In any case, the diode rectifiers assigned to stator coils of different phases may preferably share a common neutral of the utility grid.

As mentioned above, a diode rectifier may be constructed in different ways from a number of simple diodes. Numerous designs of diode rectifiers circuits are known from the art. Usually, rectifier circuits are differentiated into half wave and full wave rectifiers. Both types may be used in the course of the invention.

For example, in one preferred embodiment each of the diode rectifiers comprises a bridge rectifier, which usually comprises four diodes.

In another preferred embodiment each of the diode rectifiers comprises at most two diodes. Adding only one or two diodes to each stator coil instead of a rectifier bridge keeps the number of rectifier components to a minimum. This simplified configuration, with a reduced number of elements, allows a further reduction in the overall costs of the generator.

In order to realize a compact and space-saving construction the diode rectifiers are preferably mounted on the stator, for example on an outside surface of the stator or in cavities arranged in a stator body or in segments of the stator body.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

Figure 1:
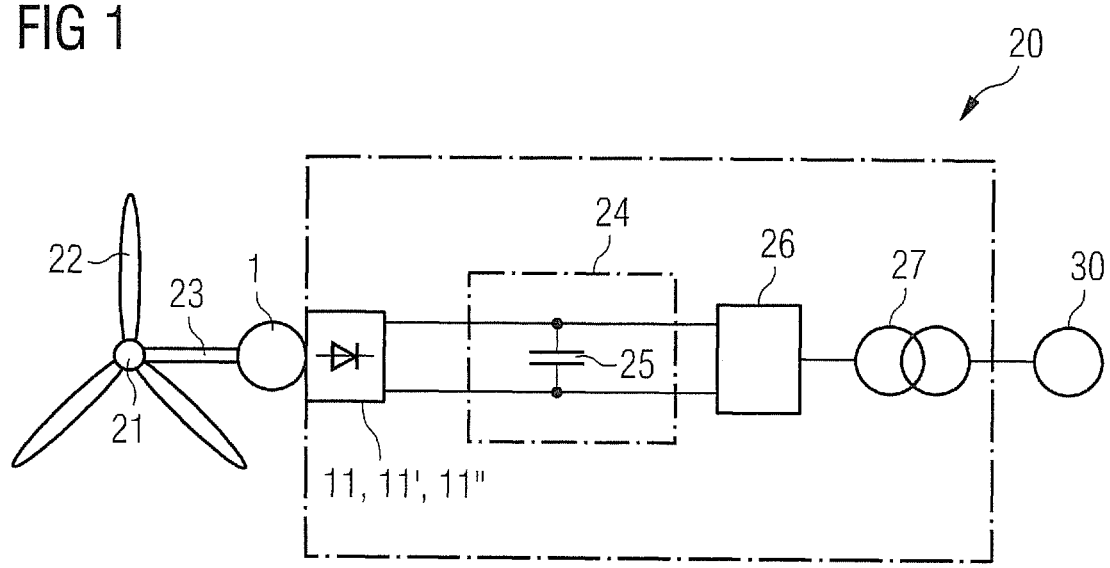
FIG. 1 is a schematic representation of a wind turbine connected to a utility grid.

In the drawings, like reference numbers refer to like objects throughout. Objects in the diagrams are not necessarily drawn to scale.

FIG. 1 schematically shows the principle of construction of the energy producing system of a wind turbine 20. Such a wind turbine 20 usually comprises a tower (not shown in the figure) that may be erected on firm ground, on a seabed, or on any other suitable support. At the top of the tower a Nacelle (not shown in the figure) is mounted which carries a hub 21 with rotor blades 22. As schematically indicated in FIG. 1, a generator 1, which may be a direct-drive generator 1, is arranged in the wind turbine Nacelle and connected to the hub via a shaft 23 or drive train. Generators others than a direct drive generator, for example a generator coupled to the hub via a gearbox, may be conceivable, as it will be readily apparent to a person skilled in the art.

By rotation of the hub a rotor in a permanent magnet (PM) generator 1 is caused to rotate, and the output voltage induced in stator coils of the PM generator 1 is rectified, as explained later in accordance with FIGS. 2 to 4 by a number of stator mounted diode rectifiers of a generator-utility grid interface 10. The generator-utility grid interface 10 further comprises a variable-voltage DC link 24 with a capacitor 25 feed by the rectified voltage pulses of the generator, and an inverter 26, for example a force-commutated inverter, to create a defined alternating output voltage. A transformer 27 of the generator-utility grid interface 10 brings the alternating voltage to a suitable peak level and frequency for feeding the energy into the utility grid 30.

Figure 2:
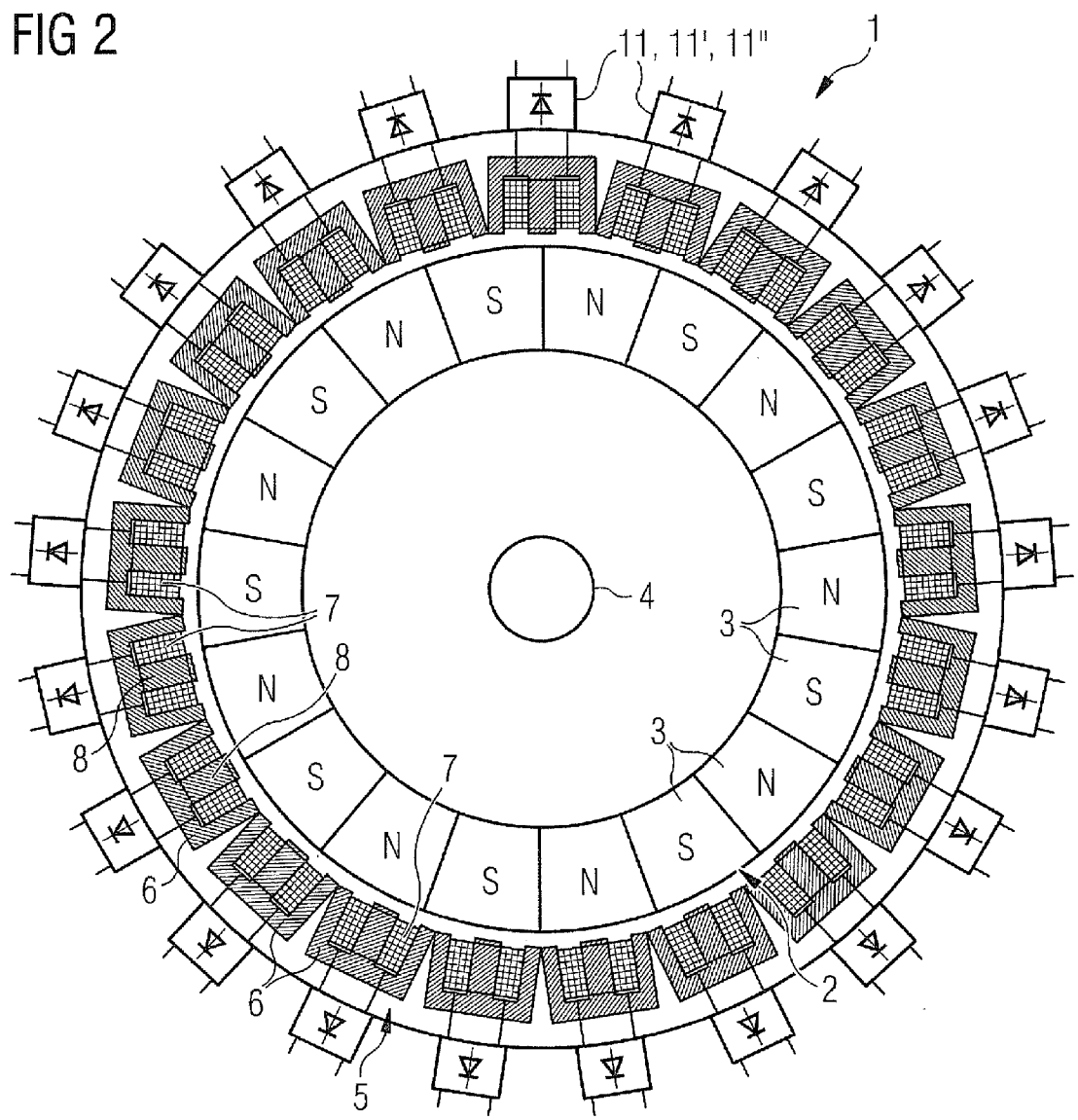
FIG. 2 shows a schematic view of an embodiment of a generator according to the invention.

FIG. 2 illustrates a direct drive generator 1 configuration according to an embodiment of the invention, which may be used in the arrangement according to FIG. 1. The generator 1 is a brushless generator 1 that has a permanent magnet rotor 2 which is mounted on a shaft 4 and has a number M=18 magnetic pole shoes 3, with alternating magnetic north poles N and south poles S. The rotor 2 can be constructed in a usual manner as known from the art. The shaft 4 may be directly connected to the hub of a wind turbine.

The rotor 2 is surrounded by a ring shaped stator 5 comprising a number of stator segments 6. Each of the stator segments 6 comprises a magnetic yoke with slots and a central pole 8 and a coil 7 wound into the slots around the pole 8. The yoke is formed of a ferromagnetic material such as iron or the like, so as to be good conductor of magnetic flux. In the embodiment shown in FIG. 2 the number of segments and, therefore, the number C of stator coils 7 is 21. Thus, the number C of stator coils 7 is greater than, but not an integer multiple of, the number M of rotor pole shoes 3. The 21 stator coils 7 may be grouped into three groups of seven stator coils 7, each group is assigned to a certain phase of a three-phase utility grid.

As can clearly be seen from FIG. 2, by using the given numbers of stator coils 7 and magnetic rotor pole shoes 3, the rotor pole shoes 3 cannot all synchronously pass stator coils 7 at the same time during rotation. Therefore, the magnetic attractions between the stator poles and rotor pole shoes 3 are essentially evenly distributed, or averaged out, during rotation of the rotor. Therefore, the unwanted effect of cogging torque is minimized and vibration and noise in the machine are reduced. As it will be known for the person skilled in the art of generators, the cogging torque is an unwanted torque component that is due to the attraction of stator poles by the magnets. Said unwanted torque causes vibrations and noise. Therefore it is desirable to reduce the cogging torque in the generators.

It should be noted that the specified numbers of stator coils 7 and rotor pole shoes 3 (18 and 21 respectively) are merely exemplary, and that, in a real construction the generator may have much greater numbers of stator coils 7 and rotor pole shoes 3. For example, the number M of rotor pole shoes may preferably be between 50 and 150, and the number C of stator coils 7 may preferably be between 50 and 200.

A stator may also be constructed in a different manner, for example as a fractional-slot winding stator, in which each slot may house two or more separate coils. Some slots may contain coils of the same phase while other slots will have coils from two different phases. Furthermore, the generator may comprise either an internal rotor—as shown in the configuration illustrated in FIG. 2—or an external rotor. For example, most direct-drive generators for wind turbines of the new generation are generators with an external rotor. It is merely required that the number C of stator coils and the number M of magnetic rotor pole shoes are chosen according to the invention.

In the embodiment according to FIG. 2 all stator coils 7 are connected to their own separate diode rectifier 11, 11', 11". This diode rectifier 11, 11', 11" rectifies the voltage induced in the associated coil 7 during rotation of the rotor 2. The diode rectifiers 11, 11', 11" may be constructed differently manner, as will be explained later with the help of FIGS. 5 to 7, using a number of simple diodes.

Figure 3:
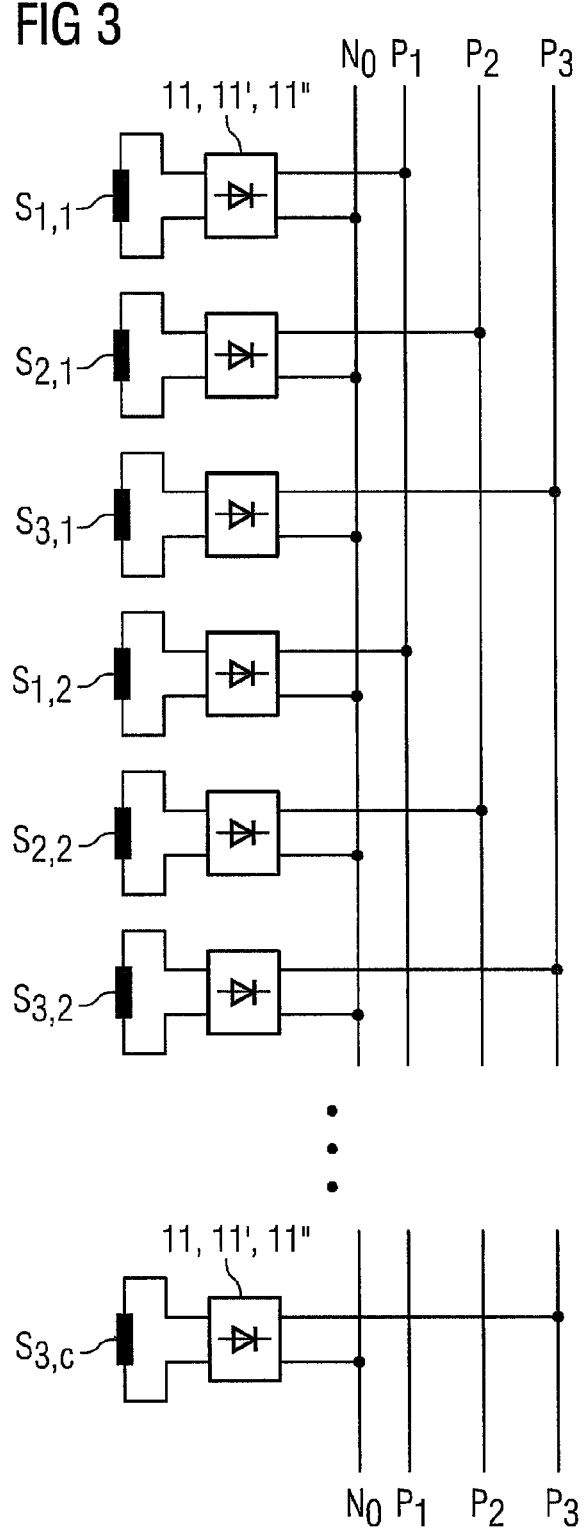
FIG. 3 illustrates a three-phase generator system with a rectification configuration according to an embodiment of the invention.

In FIG. 3 it is illustrated how the stator coils 7 may be connected to the phases $P_1$, $P_2$, $P_3$ of a three-phase utility grid. In this figure, the stator coils are given the notation $S_{x,y}$, whereby x is one of $\{1, 2, 3\}$ and denotes the phase number $P_1$, $P_2$, $P_3$ of the utility grid; and y is one of $\{1, \ldots, c\}$ and is a index variable of the stator coils connected to the x-th phase, i.e. $S_{1,1}$ should be read as "stator coil #1 connected to phase #1", $S_{2,1}$ should be read as "stator coil #1 connected to phase #2", etc. The maximum number c of the stator coils assigned to one of the phases $P_1$, $P_2$, $P_3$ is therefore the number C of all stator coils divided by three.

In the exemplary circuitry presented in FIG. 3, the stator segments share a common neutral $N_0$ and each stator coil $S_{x,y}$ is connected to one of the three phases $P_1$, $P_2$, $P_3$ via its own diode rectifier 11, 11', 11".

If such a system comprising stator-mounted diode rectifiers 11, 11', 11" as shown in FIGS. 2 and 3 is used for a prior art generator comprising an equal number of stator coils and rotor pole shoes, the current is induced in each of the stator coils at the same time during the rotation of the permanent magnet rotor. As a result, considering one phase, output voltage pulses having an identical form over time would be carried by each stator coil, and, since the coils are connected in parallel, the voltage of that phase will subsequently show that wave form over time. This signal is unsuitable for being applied to a simple DC link capacitor.

Therefore, according to the embodiment of the present invention shown in FIG. 2, the number C of stator coils and the number M of rotor pole shoes is not equal, but the number C of stator coils $S_{x,y}$ is greater than the number M of rotor pole shoes 3.

Therefore, not all the rotor pole shoes symmetrically pass stator poles at the same time during rotation. Considering one phase, the output voltages which are received from the different stator coils are "temporally shifted" against each other. This effect of time shift of the output voltages is schematically illustrated in FIG. 4 for one phase $P_1$. As already explained above, the same effect of time shift arises, when the number of rotor pole shoes is larger than, but not an integer multiple of, the number of stator coil.

Figure 4:
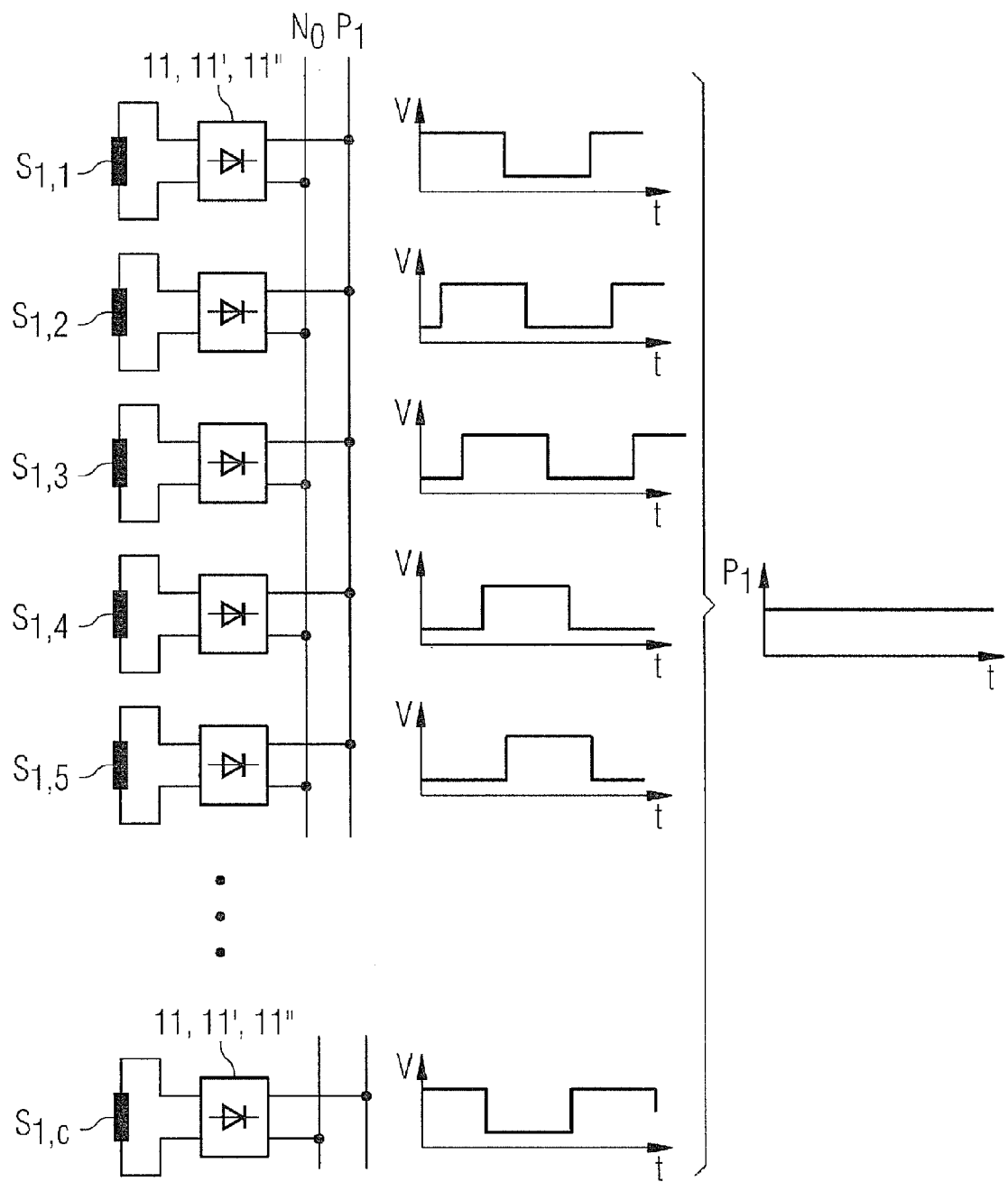
FIG. 4 schematically illustrates, for a generator according to FIG. 2 and for one phase of a rectifier configuration according to FIG. 4, the effect of the time shift for each of the output voltages.

On the right side of FIG. 4, the resulting rectified voltage is shown for one phase P1, when all the pulses received from the diode rectifiers 11, 11', 11" are superimposed by connecting the stator coils via the diode rectifiers 11, 11', 11" in parallel as shown on the left side of FIG. 4. The voltage present at the phase $P_1$ will be essentially constant and suitable as such for being applied to the DC link capacitor facilitating the connection to the utility grid 30 as shown in FIG. 1.

In FIG. 4 the output pulses from the diode rectifiers 11, 11', 11" are shown as essentially square wave pulses. This form is only used exemplarily. In a real generator, the voltage induced in a coil by a magnetic rotor pole shoe moving along the coil during rotation of the rotor has a sinusoidal pulse-shape over time. Therefore, the form of the rectified pulses output by the diode rectifiers 11, 11', 11" is more like an intermittent series of such truncated pulse shapes. However, nonetheless these pulses can be superimposed to give an essentially constant voltage if the dimension and numbers of the stator coils and rotor pole shoes are chosen such that consecutive pulses originating from different coils of the generator overlap each other by an appropriate amount.

The rectifiers 11, 11', 11" connected to the outputs of each stator coil ensures that current, which, as explained above, follows usually an essentially sinusoidal form, only flows to the phases $P_1, P_2, P_3$ when the input from the coil is "high". As mentioned above, the diode rectifiers 11, 11', 11" may be constructed in a different manner.

Figure 5:
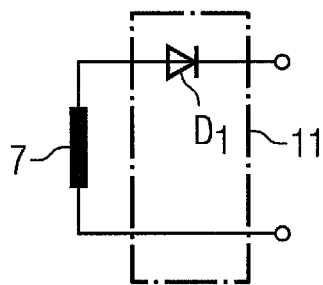
FIG. 5 is a circuit diagram of a first embodiment of a diode rectifier.

FIG. 5 shows a circuit diagram of a very simple diode rectifier 11, comprising only a single diode D1. Since a diode passes current in only one direction, only half of the incoming AC wave will reach the output of the rectifier 11. Thus, this is a basic half-wave rectifier 11.

While a half-wave rectifier as shown in FIG. 5 is very simple, it is not very efficient, because only half of the incoming AC cycle is used, and all of the energy available in the other half is wasted.

Figure 6:
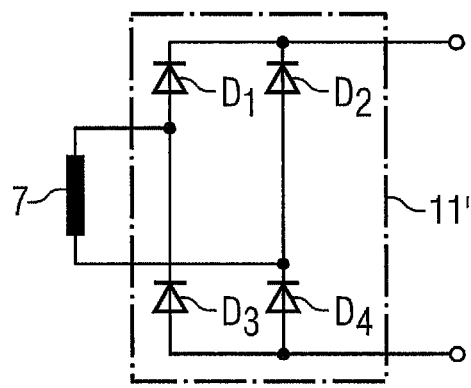
FIG. 6 is a circuit diagram of a second embodiment of a diode rectifier.

To use also the other half-wave of the voltage induced in the stator coils, a full-wave rectifier may be used. FIG. 6 shows the circuit diagram of a bridge rectifier in which four diodes $D_1, D_2, D_3, D_4$ are used. This bridge rectifier may also be used as a diode rectifier 11' in the course of the invention.

Figure 7:
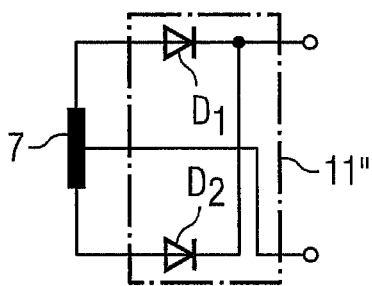
FIG. 7 is a circuit diagram of a third embodiment of a diode rectifier.

FIG. 7 shows a circuit diagram of a third diode rectifier 11" which may be used in the invention. In this construction only two diodes $D_1, D_2$ are necessary to use the full wave. To this end, the common neutral of the generator-utility grid interface can be connected to a center tap of the stator coil. This means that for this construction, a different method of mounting the coils to the stator may be required compared to the other cases in which, for example, diode rectifiers 11, 11' according to FIG. 5 or 6 are used. However, the diode rectifier 11" requires less diodes than a bridge rectifier according to FIG. 6, but uses the full wave instead of only the half wave as is the case for the diode rectifier 11 of FIG. 5.

It is to be noted, that the diode rectifiers 11, 11', 11" shown in the figures are merely preferred examples, and any other diode rectifier may be used as appropriate.

As could be shown with the help of the examples above, a generator according to the present invention with a stator coil mounted diode rectifier obviates the need for the generator side converter commonly used in the art. Since said generator side converter is, as described in connection with what solutions are known in the art, a device that introduces undesirable harmonics while transmitting the generated signal to a utility grid, its replacement by a diode rectifier leads to the favourable elimination of said undesirable harmonics. Furthermore, since the diode rectifier is a device of simple configuration, economies of space and simplicity of configuration are realized for the generator of the present invention. Furthermore, the simpler configuration of the generator leads to ease of manufacture of the generator.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A generator, comprising
a rotor with a number of magnetic rotor pole shoes;
a stator with a number of stator coils wound on the stator; and
a generator-utility grid interface comprising diode rectifiers, each one of the diode rectifiers connected to a stator coil and having an output;
wherein a number of rotor pole shoes is not equal to a number of stator coils and the number of rotor pole shoes is not an integer multiple of the number of stator coils;
wherein the diode rectifiers comprise a first, second and third plurality of diode rectifiers;
a first plurality of diode rectifier outputs connected in parallel to a first phase conductor for supplying a first plurality of AC rectified voltages to the first phase conductor, a second plurality of diode rectifier outputs connected in parallel to a second phase conductor for supplying a second plurality of AC rectified voltages to the second phase conductor, and a third plurality of diode rectifier outputs connected in parallel to a third phase conductor for supplying a third plurality of AC rectified voltages to the third phase conductor; and
each one of the first, second and third plurality of AC rectified voltages temporally shifted relative to other ones of the respective first, second and third plurality of AC rectified voltages, the temporal shift due to a relationship between the number of rotor pole shoes and stator coils, the temporal shift causing an essentially DC voltage to be present on each one of the first, second and third phase conductors.

2. The generator according to claim 1, wherein the stator coils and the rotor pole shoes are arranged such that at least a fraction of the rotor pole shoes pass stator coils asynchronously during rotation.

3. The generator according to claim 1, wherein the stator coils are assigned to different phases of a multi-phase utility grid, to which the generator is electrically connected.

4. The generator according to claim 1, wherein a group of stator coils share a common diode rectifier when these coils are assigned to a common phase and, during rotation of the rotor, each coil of the group carries a synchronous identical voltage form over time.

5. The generator according to claim 1, wherein each stator coil is connected to its own diode rectifier.

6. The generator according to claim 1, wherein each of the plurality of diode rectifiers share a common neutral.

7. The generator according to claim 1, wherein each of the plurality of diode rectifiers comprises a bridge rectifier.

8. The generator according to claim 1, wherein each of the plurality of diode rectifiers comprises at most two diodes.

9. The generator according to claim 1, wherein each of the plurality of diode rectifiers are mounted on the stator.

10. The generator according to claim 1, wherein the number of stator coils and the number of rotor pole shoes are selected such that the output voltages are induced in different stator coils during rotation of the rotor are temporally shifted against each other.

11. A wind turbine, comprising a generator according to any claim 1.

12. A method of assembling a generator, comprising:
configuring a rotor with a number of magnetic rotor pole shoes,
configuring a stator with a number of stator coils wound on the stator, the number of stator coils not equal to a number of rotor pole shoes and the number of rotor pole shoes not an integer multiple of the number of stator coils;
assembling the stator with the rotor and with a generator-utility grid interface, the generator-utility grid interface is equipped with diode rectifiers in which each of the diode rectifiers is connected to a stator coil each diode rectifier having an output;
wherein the diode rectifiers comprise a first, second and third plurality of diode rectifiers;
configuring a first plurality of diode rectifier outputs in parallel and connecting to a first phase conductor for supplying a first plurality of AC rectified voltages to the first phase conductor, configuring a second plurality of diode rectifier outputs in parallel and connecting to a second phase conductor for supplying a second plurality of AC rectified voltages to the second phase conductor, and configuring a third plurality of diode rectifier outputs in parallel and connecting to a third phase conductor for supplying a third plurality of AC rectified voltages to the third phase conductor; and
each one of the first, second and third plurality of AC rectified voltages temporally shifted relative to other ones of the respective first, second and third plurality of AC rectified voltages, the temporal shift due to a relationship between the number of rotor pole shoes and stator coils, the temporal shift causing an essentially DC voltage to be present on each one of the first, second and third phase conductors.

* * * * *